Figure 12:
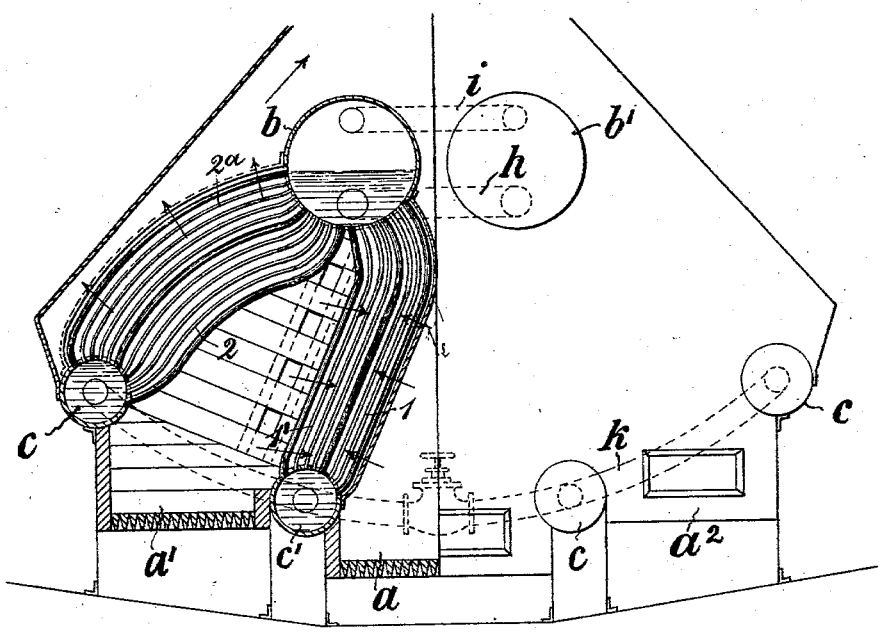
Figure 12A:
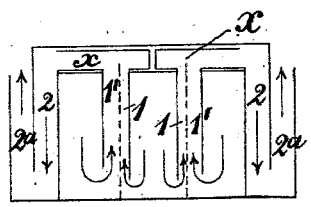
Figure 28:
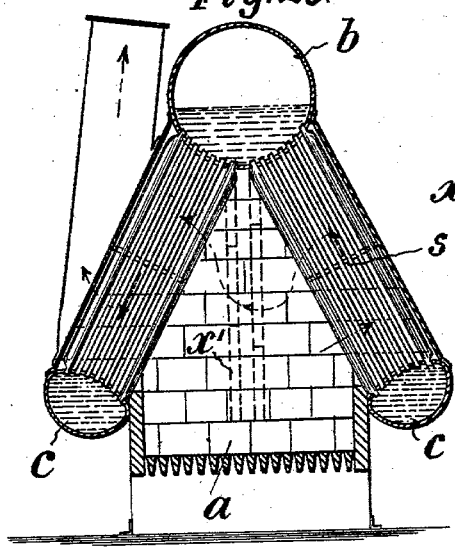
Figure 29:
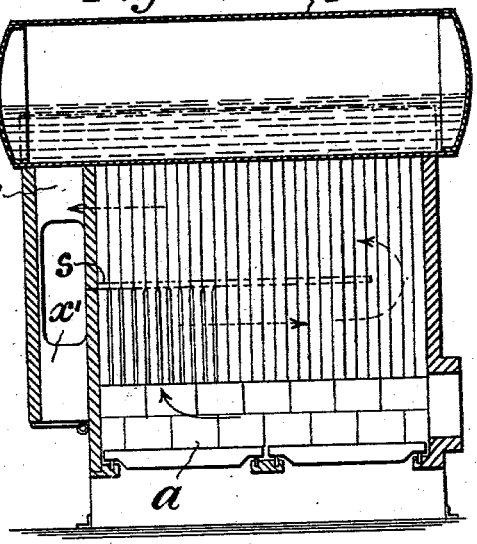
Figure 30:
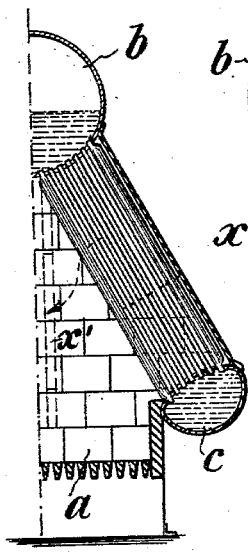
Figure 31:
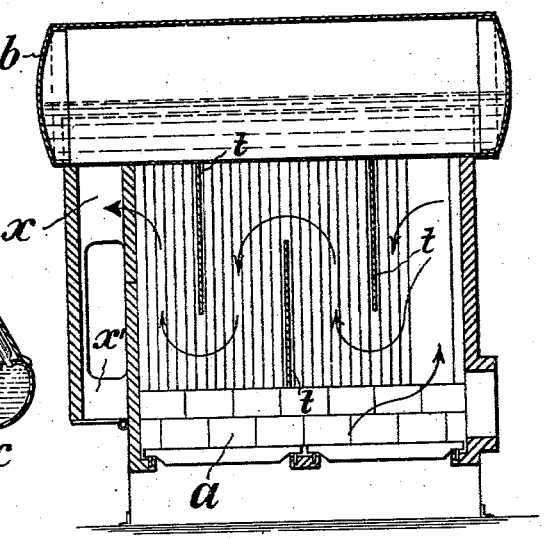

No. 746,882. PATENTED DEC. 15, 1903.
R. SCHULZ.
STEAM BOILER.
APPLICATION FILED NOV. 10, 1902.
NO MODEL. 14 SHEETS—SHEET 1.
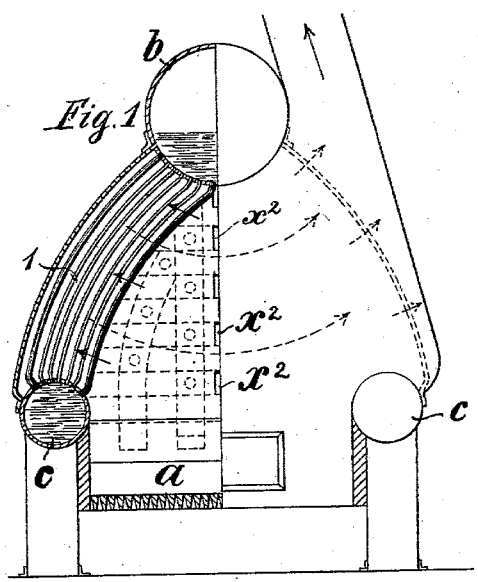
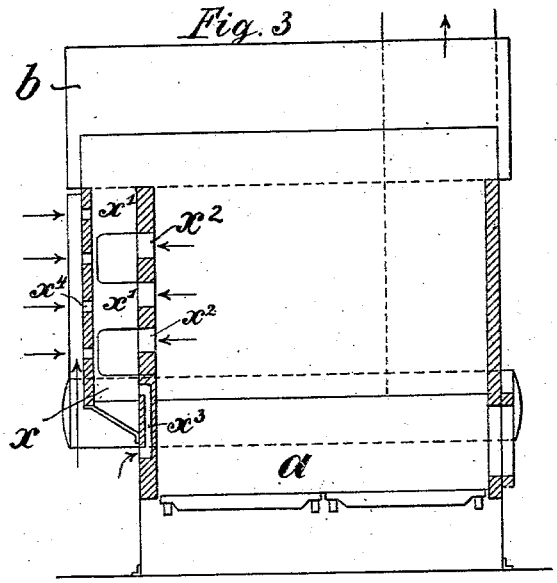
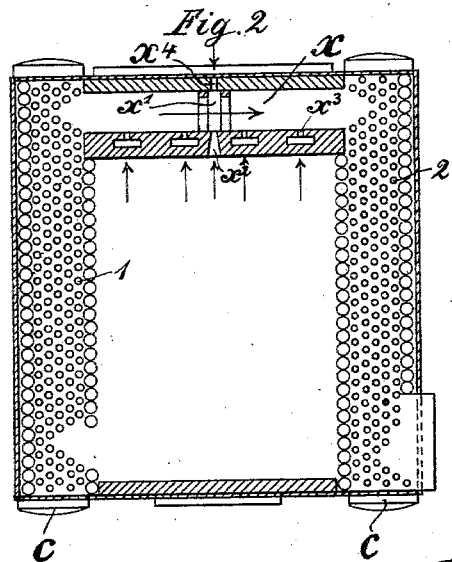
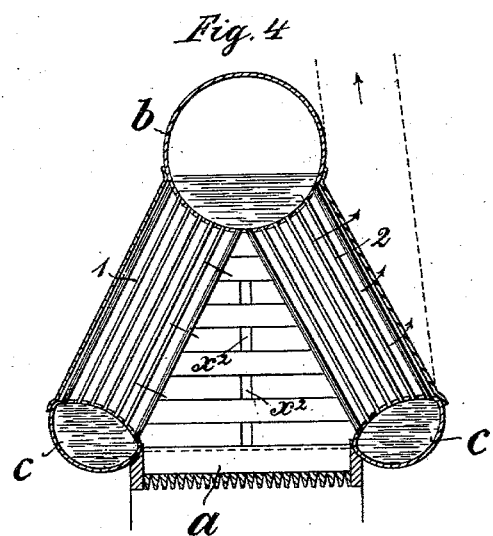
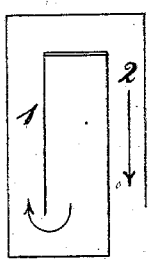

No. 746,882. PATENTED DEC. 15, 1903.
R. SCHULZ.
STEAM BOILER.
APPLICATION FILED NOV. 10, 1902.
NO MODEL. 14 SHEETS—SHEET 2.
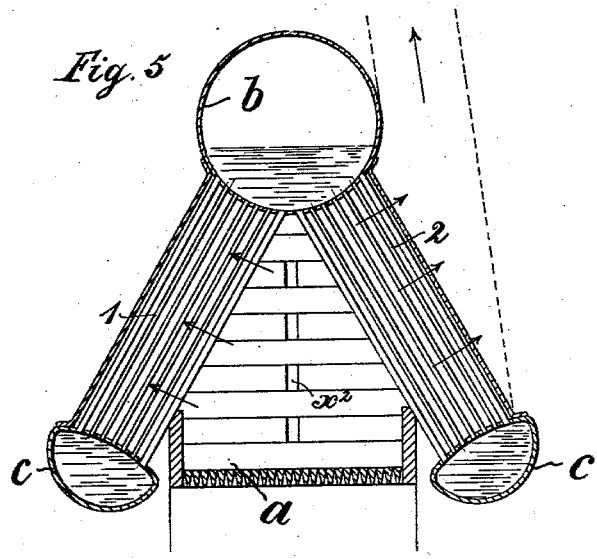
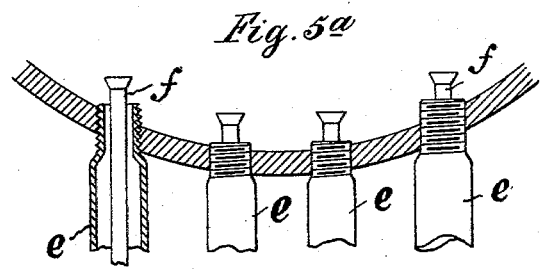
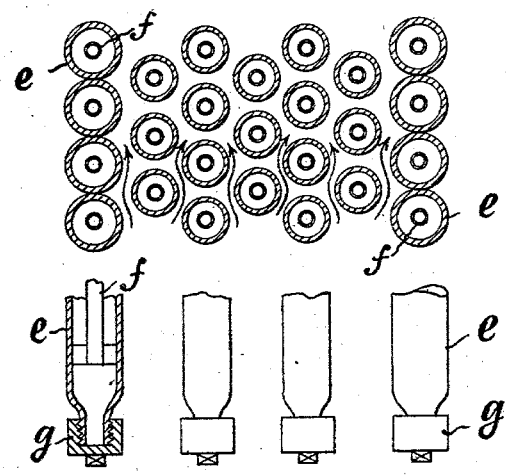

No. 746,882. PATENTED DEC. 15, 1903.
R. SCHULZ.
STEAM BOILER.
APPLICATION FILED NOV. 10, 1902.
NO MODEL. 14 SHEETS—SHEET 3.
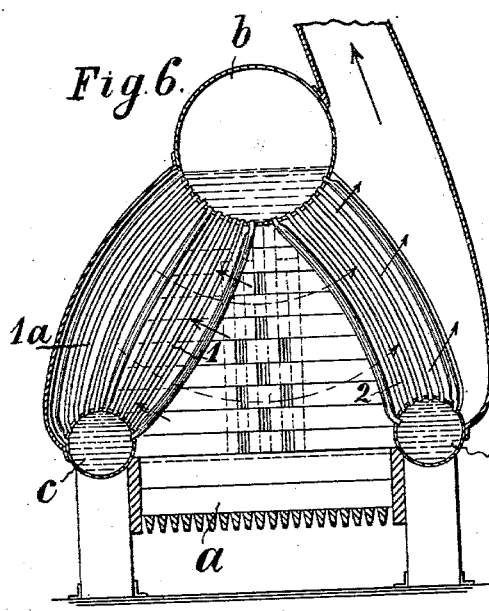
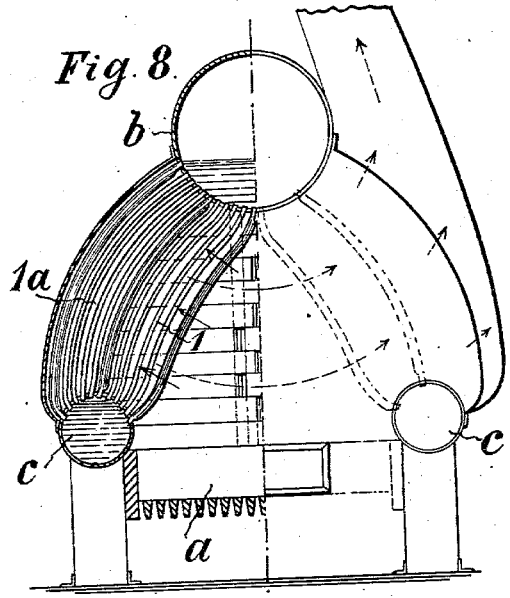
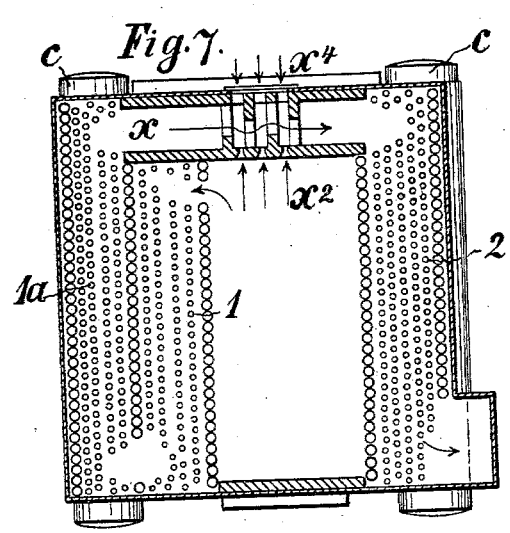
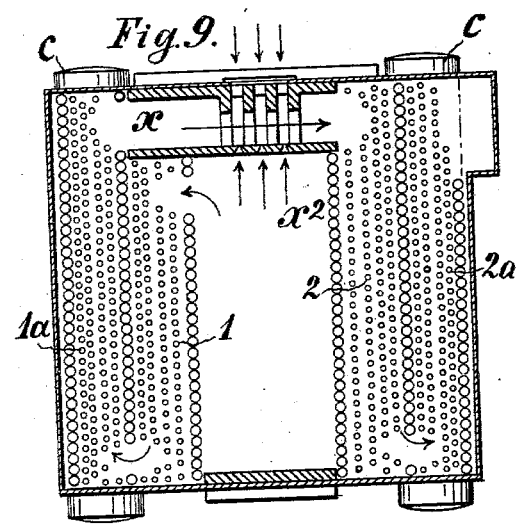
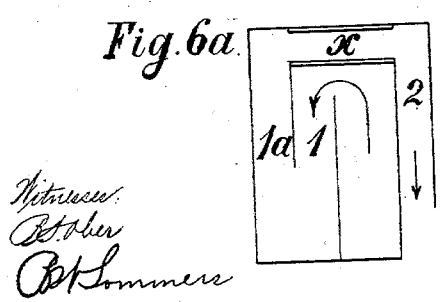
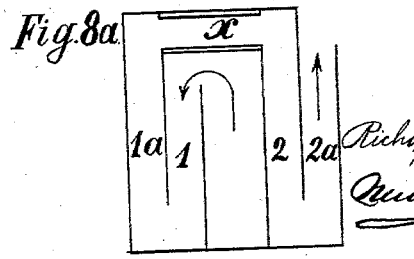

No. 746,882. PATENTED DEC. 15, 1903.
R. SCHULZ.
STEAM BOILER.
APPLICATION FILED NOV. 10, 1902.
NO MODEL. 14 SHEETS—SHEET 4.
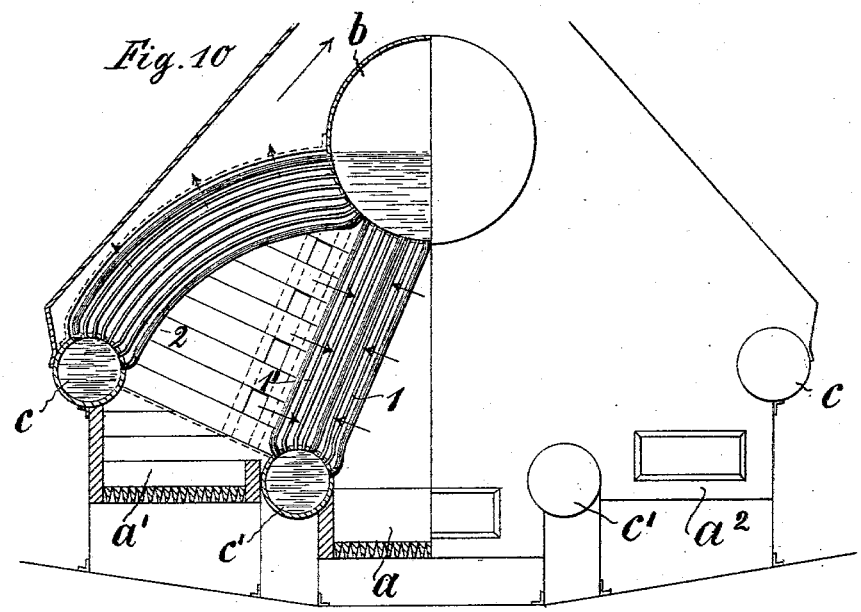
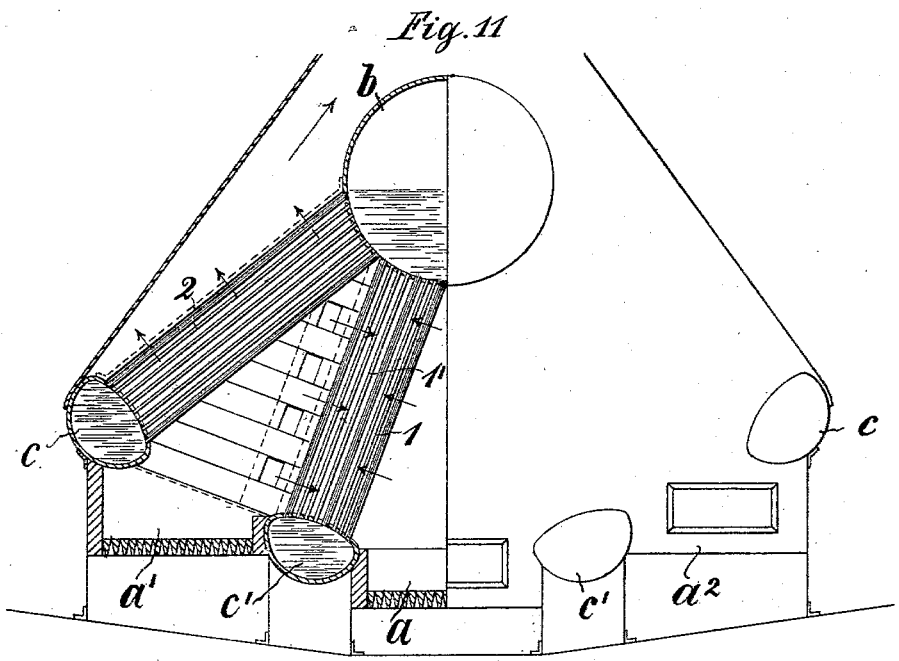
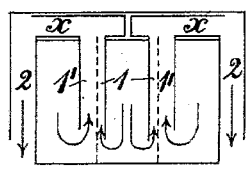

No. 746,882. PATENTED DEC. 15, 1903.
R. SCHULZ.
STEAM BOILER.
APPLICATION FILED NOV. 10, 1902.
NO MODEL. 14 SHEETS—SHEET 5.

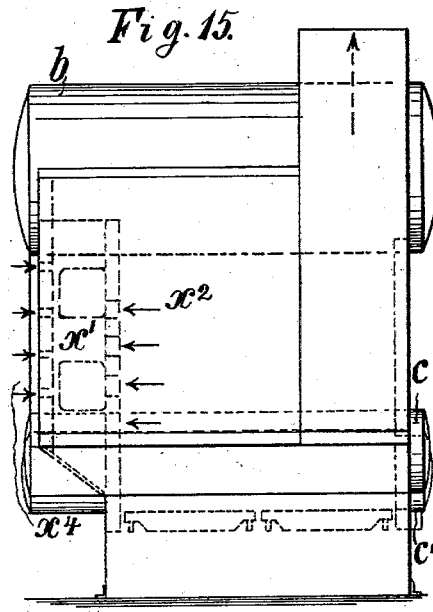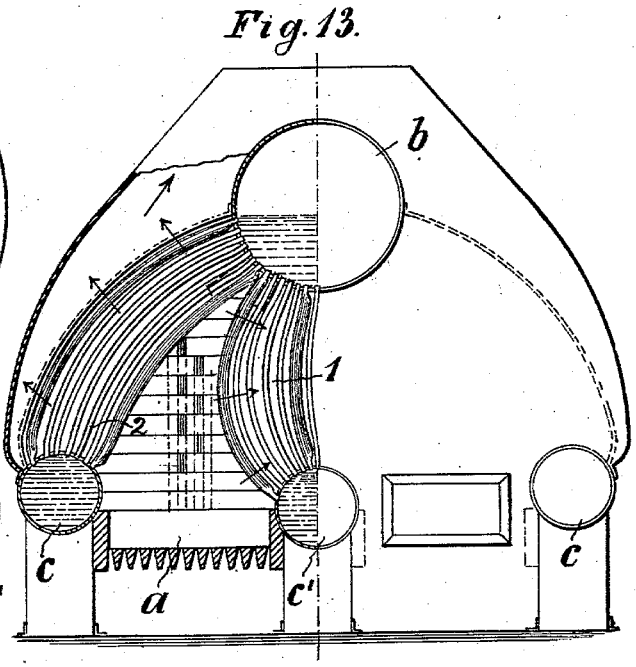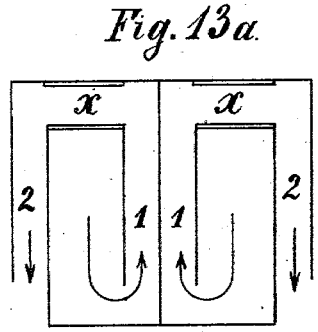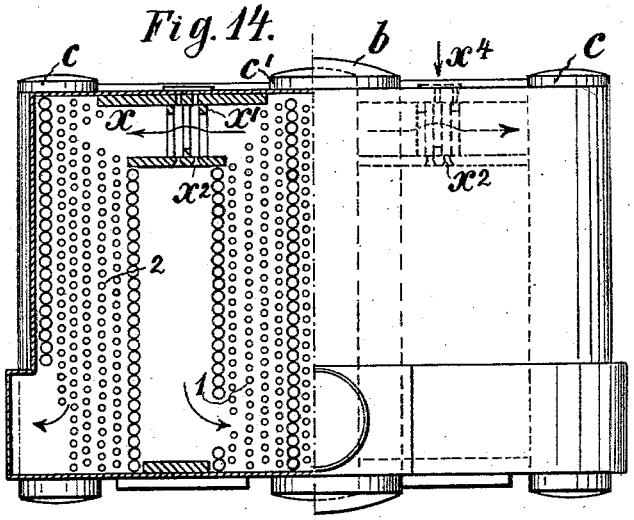

No. 746,882. PATENTED DEC. 15, 1903.
R. SCHULZ.
STEAM BOILER.
APPLICATION FILED NOV. 10, 1902.
NO MODEL. 14 SHEETS—SHEET 7.
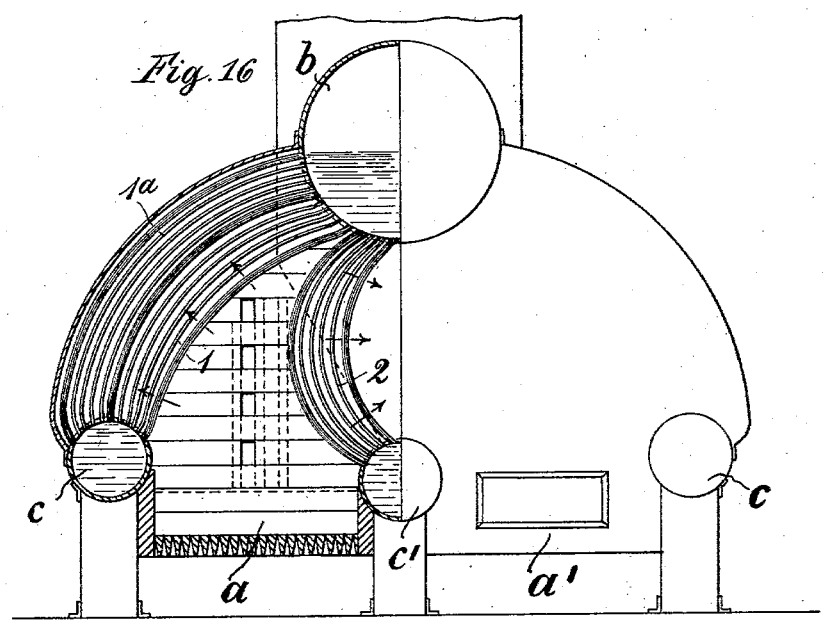
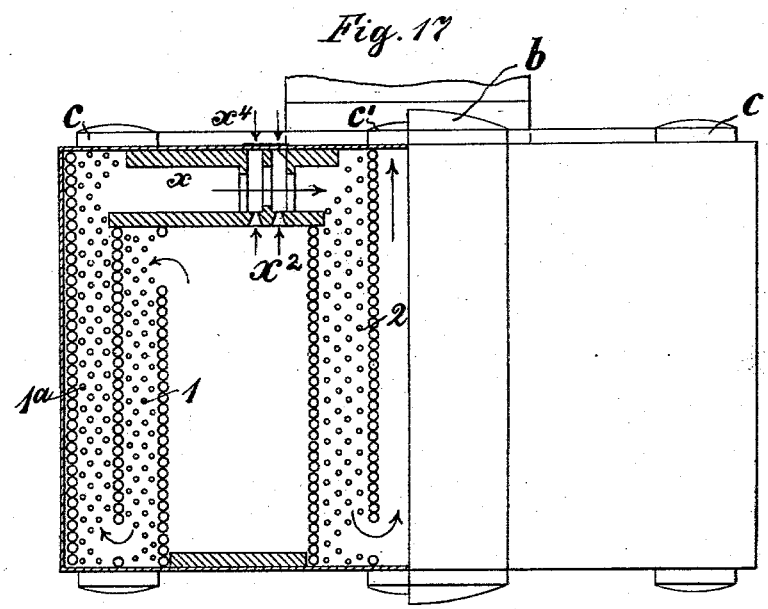
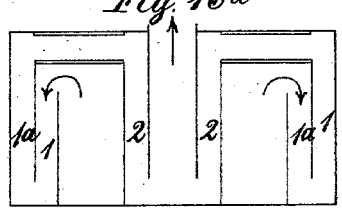

No. 746,882. PATENTED DEC. 15, 1903.
R. SCHULZ.
STEAM BOILER.
APPLICATION FILED NOV. 10, 1902.
NO MODEL. 14 SHEETS—SHEET 8.
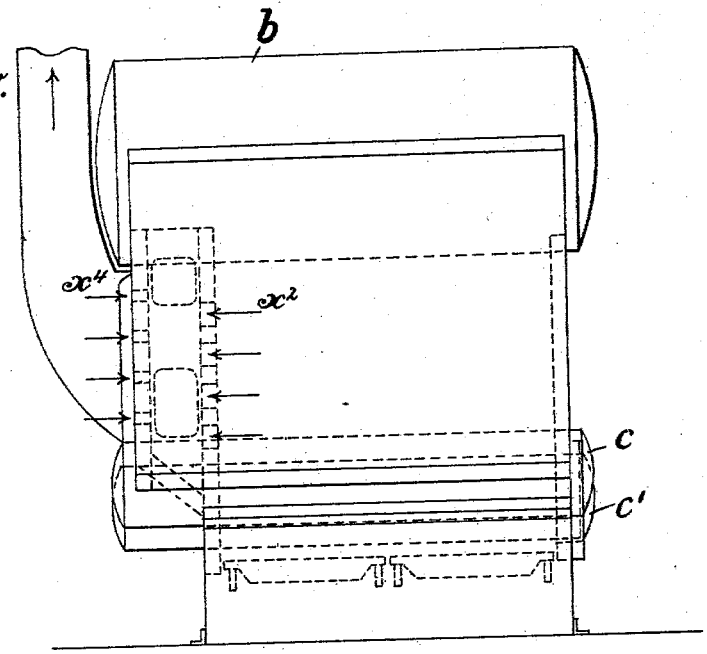
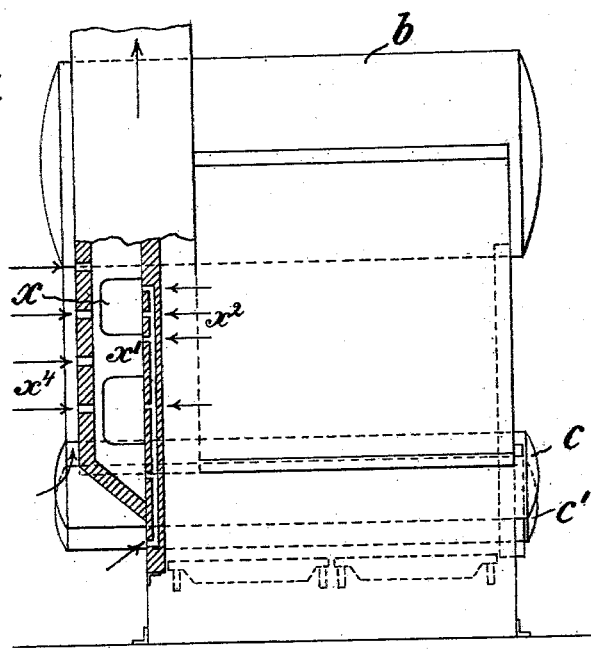

No. 746,882. PATENTED DEC. 15, 1903.
R. SCHULZ.
STEAM BOILER.
APPLICATION FILED NOV. 10, 1902.
NO MODEL. 14 SHEETS—SHEET 9.
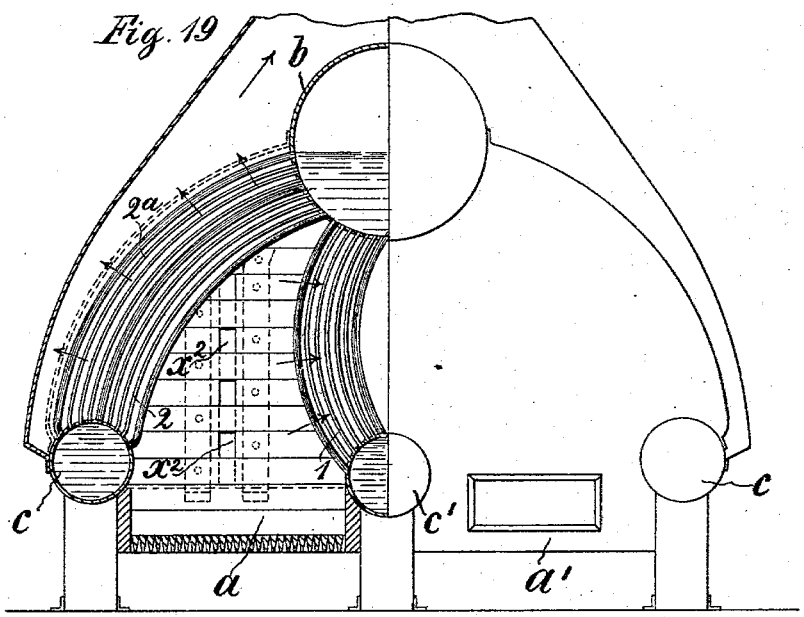
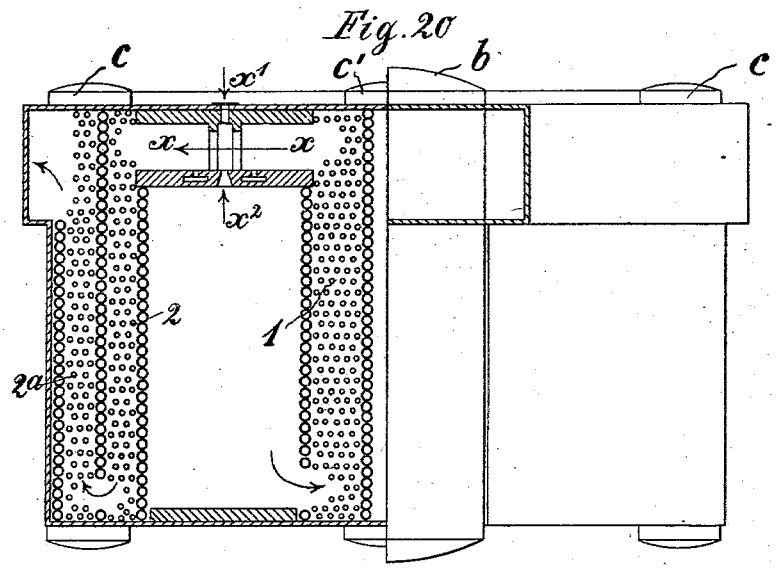
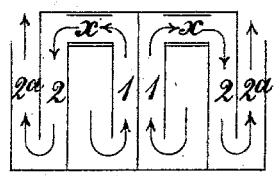

No. 746,882. PATENTED DEC. 15, 1903.
R. SCHULZ.
STEAM BOILER.
APPLICATION FILED NOV. 10, 1902.
NO MODEL. 14 SHEETS—SHEET 10.
Fig. 22.
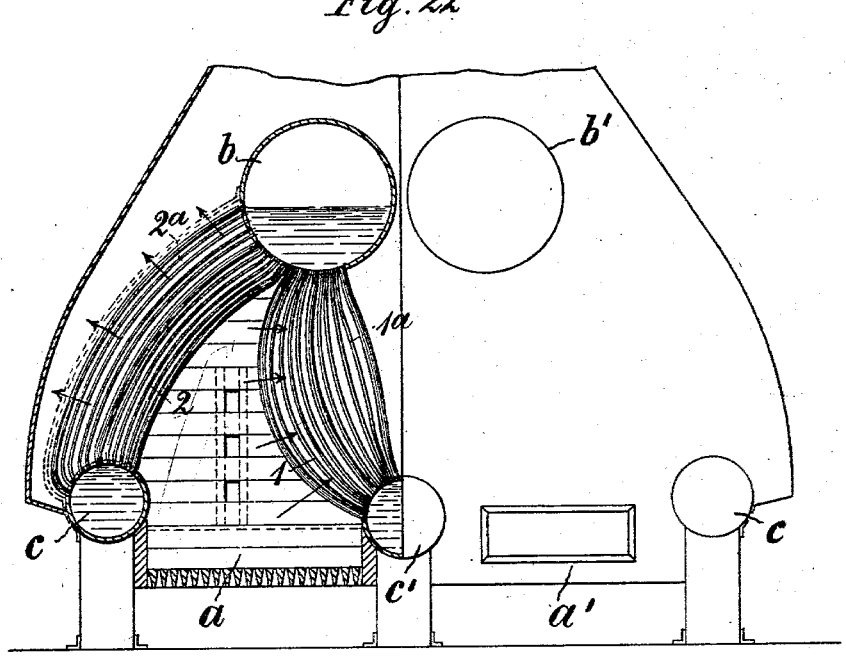
Fig. 22ª
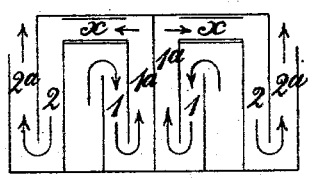

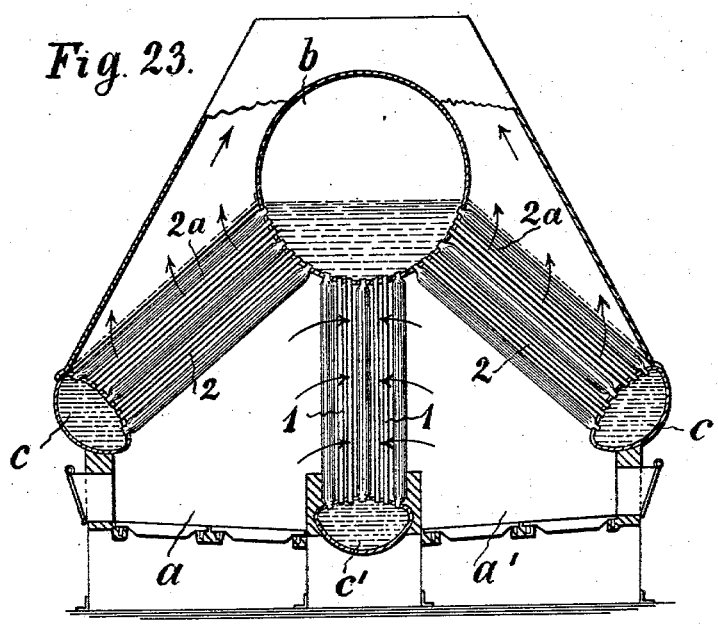
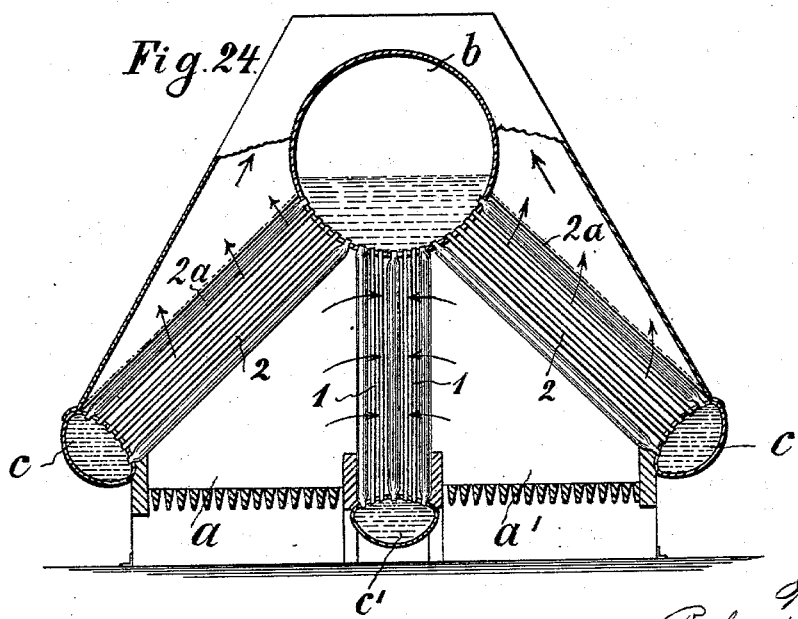

No. 746,882. PATENTED DEC. 15, 1903.
R. SCHULZ.
STEAM BOILER.
APPLICATION FILED NOV. 10, 1902.
NO MODEL. 14 SHEETS—SHEET 12.
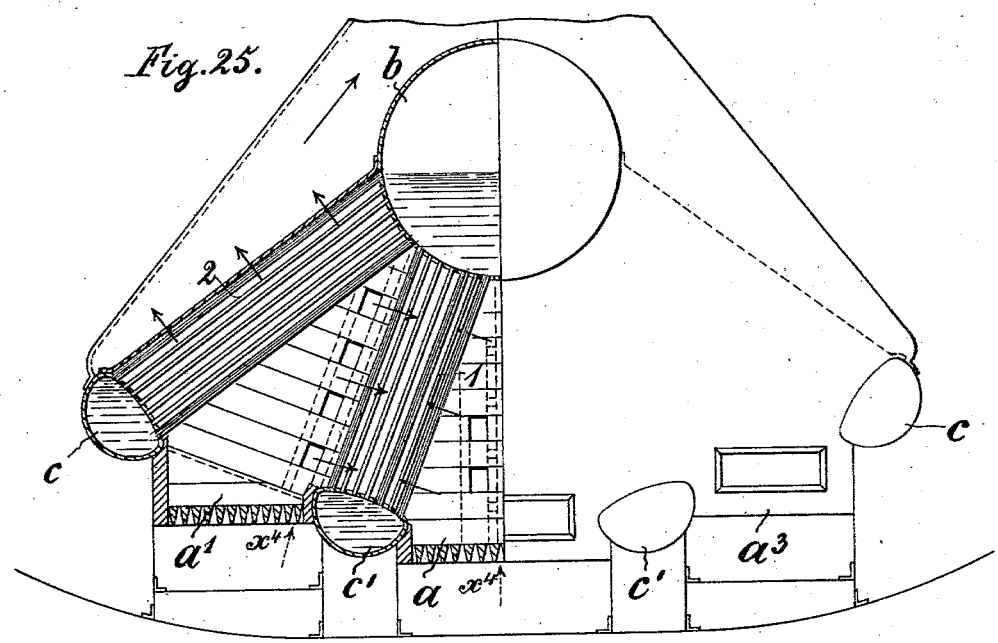
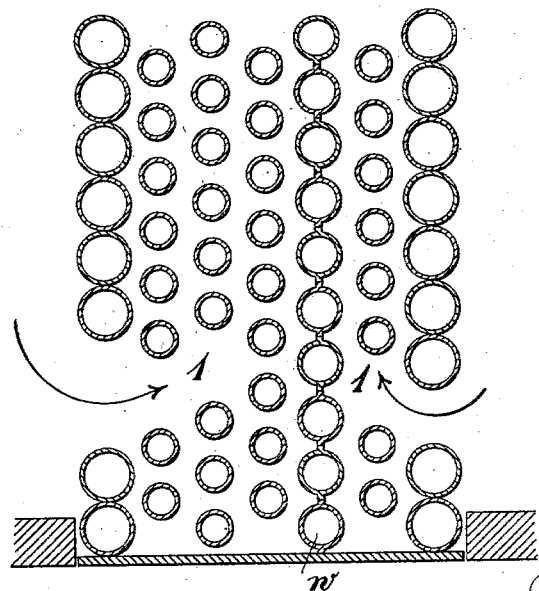

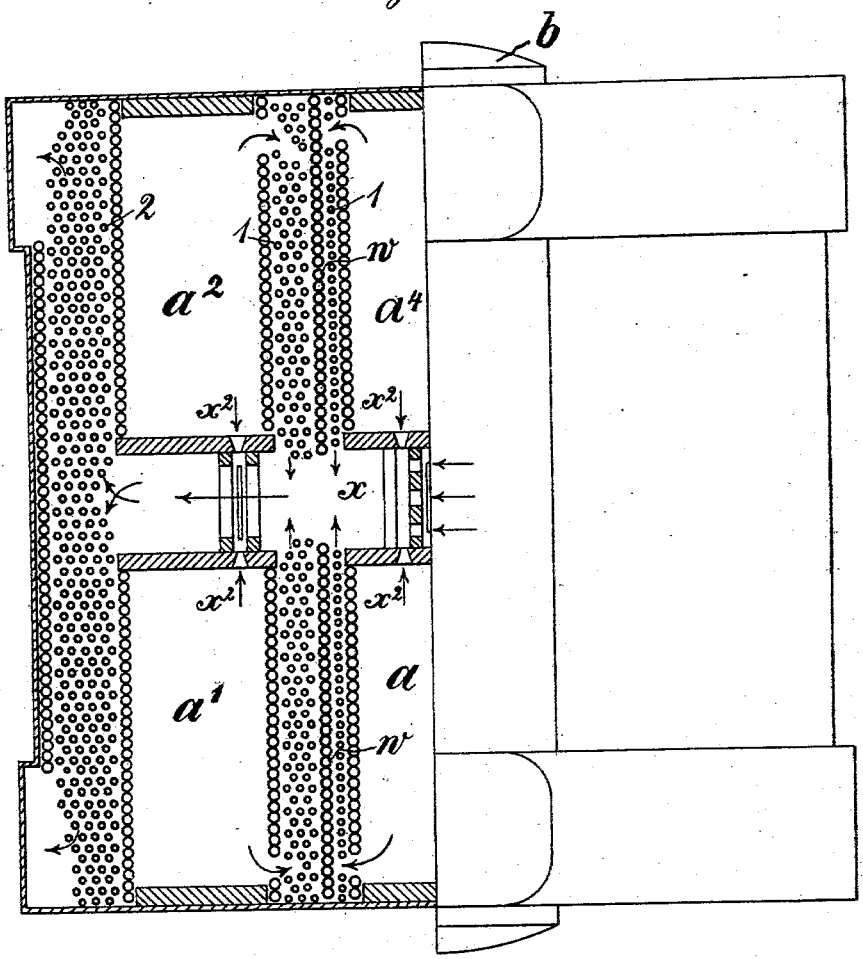

No. 746,882. Patented December 15, 1903.

UNITED STATES PATENT OFFICE.

RICHARD SCHULZ, OF BERLIN, GERMANY.

STEAM-BOILER.

SPECIFICATION forming part of Letters Patent No. 746,882, dated December 15, 1903.

Application filed November 10, 1902. Serial No. 130,761. (No model.)

*To all whom it may concern:*

Be it known that I, RICHARD SCHULZ, a subject of the German Emperor, residing at Berlin, in the Empire of Germany, have invented certain new and useful Improvements in Steam-Boilers; and I do hereby declare the following to be a full, clear, and exact description of the invention, such as will enable others skilled in the art to which it appertains to make and use the same, reference being had to the accompanying drawings, and to letters and figures of reference marked thereon, which form a part of this specification.

My invention relates to steam-boilers, and has for its object the provision of a separate chamber independent of the combustion-chamber for completely burning the products of combustion generated in said combustion-chamber after they have passed through one or more sets of water-tubes one or more times and consists of a crossover or chamber built of fire-brick or other suitable fireproof material across the end of the combustion-chamber and preferably, though not necessarily, provided with staggered partition-walls acting as baffle-plates to cause the gases to deposit the fine ash carried by them and at the same time means may be provided to admit fresh furnace-gases directly from the combustion-chamber in front of this auxiliary combustion-chamber and also fresh air to supply the necessary oxygen for combustion. This air may be preheated or not, as desired.

Referring to the drawings, in which like parts are similarly designated, Figure 1$^a$ is a diagram showing the course of gases through a boiler shown partly in vertical and horizontal section in Figs. 1 and 2 and in vertical longitudinal section in Fig. 3. Fig. 4 is a cross-section of a similar boiler having straight water-tubes; Fig. 5, a cross-section in which there are no water-drums. Fig. 5$^a$ shows the structure of the water-tubes in Fig. 5. Fig. 6$^a$ is a diagram showing the course of furnace-gases through a boiler shown in vertical and horizontal cross-section in Figs. 6 and 7. Fig. 8$^a$ is a diagram showing the course of furnace-gases in a boiler shown in vertical and horizontal section in Figs. 8 and 9. Fig. 10$^a$ is a diagram illustrating the course of furnace-gases in a boiler shown partly in vertical section in Figs. 10 and 11. Fig. 12$^a$ is a similar diagram showing the direction of furnace-gases in the boiler shown in section in Fig. 12. Fig. 13$^a$ is a diagram showing the direction of furnace-gases in the boiler shown in vertical and horizontal cross-section in Figs. 13 and 14 and in vertical longitudinal section in Fig. 15. Fig. 16$^a$ is a diagram of the direction of furnace-gases in the boiler such as shown in vertical and horizontal cross-section in Figs. 16 and 17 and partly in vertical longitudinal section in Fig. 18. Fig. 19$^a$ is a diagram of the direction of furnace-gases in the boiler shown in vertical and horizontal cross-section in Figs. 19 and 20 and in vertical longitudinal section in Fig. 21. Fig. 22$^a$ is a diagram of the direction of furnace-gases in the boilers shown in cross-section in Figs. 22, 23, and 24. Figs. 25 and 26 show the structure of the so-called "double" boiler. Fig. 27 is a cross-section of the arrangement of the tubes in Fig. 26. Figs. 28, 29, 30, and 31 show a modification in which the gases take a tortuous path through the several sets of tubes.

In all of the figures the arrangement is such that there is a continuous passage of gases from the main combustion-chamber around all of the tubes adjacent the combustion-chamber on one side thereof to the auxiliary combustion-chamber located at the back of the main combustion-chamber to a set or sets of tubes adjacent to and on the other side of the main combustion-chamber. In the auxiliary combustion-chamber gases after giving up some of their heat to one or more sets of water-tubes are burned at a lower temperature than in the main combustion-chamber, and from it the gases pass either one or a plurality of times along the side of the main combustion-chamber to heat one or more sets of tubes, whereby the unburned products of combustion are completely burned before passing the latter set or sets of tubes, and considerable of the ash carried by the gases is deposited in the auxiliary combustion-chamber.

It will be observed that the center of the auxiliary combustion-chamber is narrowed and preferably, though not necessarily, provided at this point with walls or baffle-plates extending into the chamber to cause the deposit of the ash, and at such points a supply of fresh furnace-gases is admitted, together with air. Generally in all the structures shown the gases take a horizontal tortuous course from the main combustion-chamber and through the auxiliary combustion-chamber so that as much of the heat in said gases as possible will be imparted to the water-tubes on either side of the combustion-chamber.

Referring more particularly to Figs. $1^a$, 2, and 3, which show a boiler having a single main combustion-chamber $a$, a single steam-drum $b$, and two lateral lower water-drums $c$. The gases from the main combustion-chamber $a$ pass through the lateral set of tubes 1, then through the auxiliary combustion-chamber $x$, and then through the lateral set of tubes 2. At the center of the auxiliary combustion-chamber $x$ are walls $x'$ or partial partitions that narrow the chamber at this point and cause the furnace-gases to take either an up and down or a back and forth direction, thereby acting as baffle-plates, and between these walls are passages $x^2$, leading from the main combustion-chamber to supply fresh furnace-gases, and within the wall between the main and the auxiliary combustion-chambers are passages $x^3$ for the admission of air through said wall. The rear wall of the auxiliary combustion-chamber is also provided with small passages $x^4$ for similar purposes. The air can be admitted to the auxiliary combustion-chamber in any desired manner, as by forming long passages in the walls of the auxiliary combustion-chamber or other suitable places in order to preheat the air, such preheating passages being shown at $x^3$. In order to maintain a closed passage for the fire-gases among the water-tubes, the latter are arranged in a well-known way to form tubular walls around the main combustion-chamber, with open passages at those points where the gases must enter and leave each set of tubes.

In Fig. 4, which is in all respects similar to Fig. 1, the water-tubes are perfectly straight, and in Fig. 5, which is also similar to Fig. 1, these water-tubes are straight. When lower drums are dispensed with, the tubes are formed double, as shown in Fig. $5^a$, of an outer tube $e$ and an inner tube $f$, closed at their lower ends, the tube $f$ ending somewhat above the bottom of the tube $e$ and fitting into a spider $g$ or other suitable device, there being no water-drums.

Referring to Figs. $6^a$, 6, and 7, which show a single main combustion-chamber $a$, having at one side two sets of tubes 1 and $1^a$, forming a continuous passage leading to the auxiliary combustion-chamber $x$, from which the furnace-gases go to the set of tubes 2 on the other side of the main combustion-chamber.

Figs. $8^a$, 8, and 9 show a single combustion-chamber $a$, in which the furnace-gases pass from the rear of the main combustion-chamber through two sets of tubes 1 and $1^a$ on one side of the main combustion-chamber to the auxiliary combustion-chamber $x$, and then through two sets of tubes 2 and $2^a$ on the other side of the main combustion-chamber.

Referring to Figs. $10^a$, 10, and 11, these show a boiler having a steam-drum $b$, lateral water-drums $c$ $c$, and intermediate water-drums $c'$ $c'$, and three main combustion-chambers $a$, $a'$, and $a^2$, in which the gases pass from the main combustion-chambers forward, then back through the set of tubes 1 on each side of the central main combustion-chamber $a$ to each of the auxiliary combustion-chambers $x$. The gases from the combustion-chambers $a'$ and $a^2$ each pass forward through a similar set of tubes $1'$, parallel to those 1, and unite in the auxiliary combustion-chamber $x$ with those from the chamber $a$, when they pass forward through single sets of tubes 2, whereby those sets of tubes 1 and $1'$ uniting the steam-drum $b$ with the intermediate water-drum $c'$ are acted upon on both sides by gases from the main combustion-chambers, while those 2 are acted on by gases from the auxiliary combustion-chamber $x$.

Referring to Figs. 12 and $12^a$, which show a similar structure, there being two steam-drums $b$ and $b'$, connected by steam-tube $i$, and a water-tube $h$, each steam-drum being connected to two water-drums $c$ and $c'$, respectively, and all the water-drums connected by a circulating-pipe $k$. Gases will pass from the main combustion-chambers $a$, $a'$, and $a^2$ forward and through the sets of tubes 1 and $1'$, between adjacent main combustion-chambers, and be united in the auxiliary combustion-chambers $x$ to form two currents, each current then passing twice along a lateral main combustion-chamber $a'$ or $a^2$ through sets of tubes 2 and $2^a$.

Figs. $13^a$, 13, 14, and 15 show a boiler having a single steam-drum $b$ and three water-drums $c$ $c$ $c'$ and two main combustion-chambers $a$ and $a'$. From each combustion-chamber the gases pass forward and then through tubes 1 to an auxiliary combustion-chamber $x$, behind each main combustion-chamber, and then through the tubes 2.

Figs. $16^a$, 16, 17, and 18 show a single upper steam-drum $b$, connected to three lower drums $c$ $c$ $c'$ and two combustion-chambers $a$ and $a'$, from both of which the furnace-gases first pass from the rear through a set of tubes 1, then through a set of tubes $1^a$ through the auxiliary combustion-chamber $x$, through a set of tubes 2 to a common flue between the two combustion-chambers, from which they pass into the stack.

Figs. $19^a$, 19, 20, and 21 show a structure similar to Fig. 16, in which there is no central passage in which the gases are united between the main combustion-chambers $a$ and $a'$ just before they reach the stack. The gases from each of the forward ends of the main combustion-chambers pass through the set of tubes 1 to the auxiliary combustion-chamber $x$, thence through a set of tubes 2 and $2^a$, the sets of tubes 1 being in close proximity without a flue or passage between them.

In Figs. 22 and $22^a$ there are two steam-drums $b$ and $b'$, connected to water-drums $c$ $c$ and $c'$, the gases from the main combustion-chambers $a$ and $a'$ passing along each side of the main combustion-chamber from the rear of said chambers, first through a set of tubes 1 and $1^a$ to the auxiliary combustion-chamber $x$, then through a set of tubes 2 and $2^a$.

Figs. 23 and 24 show a single steam-drum $b$ and combustion-chambers $a$ and $a'$, the former figure having lower water-drums $c$ $c$ and $c'$, the latter having no water-drums. In each of these the gases pass first through a set of tubes 1 to the auxiliary combustion-chamber and then through the two sets of tubes 2 and $2^a$.

In Figs. 25 and 26 there is a single steam-drum $b$ and six combustion-chambers $a$, $a'$, $a^2$, $a^3$, $a^4$, and $a^5$. From the fore ends of these chambers the gases pass through adjacent sets of tubes 1, separated from one another by a wall of water-tubes $w$, and between adjacent combustion-chambers into the auxiliary combustion-chamber $x$ and then through lateral sets of tubes 2 at the sides of the outer combustion-chambers $a'$, $a^2$, $a^3$, and $a^5$ into the stack.

Fig. 27 shows the arrangement of the central set of water-tubes 1 and a dividing-wall $w$ to divide the set of tubes between the central and the lateral main combustion-chambers.

Figs. 28, 29, 30, and 31 show arrangements in which the gases have an up and down passage in a general longitudinal direction through the sets of tubes, and this is accomplished by inserting partitions $s$ and $t$ in said set of tubes.

Having now described my said invention, what I claim as new, and desire to secure by Letters Patent, is—

1. In a steam-boiler, the combination with the steam-drum and two or more lower water-drums, water-tubes arranged in sets connecting the water-drums with the steam-drum, a main combustion-chamber between each two water-drums, means to direct furnace-gases around said tubes, an auxiliary combustion-chamber separate from and at one end of the main combustion-chamber to form a conducting-passage for furnace-gases from one set of tubes to another, and means to supply a promoter of combustion in said chamber, substantially as described.

2. In a steam-boiler, the combination with the steam-drum and two or more lateral lower water-drums, water-tubes arranged in sets and connecting the water-drums with the steam-drum, a main combustion-chamber between each two water-drums, means to direct furnace-gases around the tubes and an auxiliary combustion-chamber at one end of the main combustion-chamber, a wall separating the two chambers and means to supply some of the furnace-gases directly to the auxiliary combustion-chamber from the main combustion-chamber, said auxiliary combustion-chamber connecting the passages through sets of tubes to form a single continuous passage for furnace-gases, substantially as described.

3. In a steam-boiler, the combination with the steam-drum and two or more lateral lower water-drums, water-tubes arranged in sets and connecting the water-drums with the steam-drum, a main combustion-chamber between each two water-drums, means to direct furnace-gases around the tubes, an auxiliary combustion-chamber independent of the main combustion-chamber and having inlets for a promoter of combustion connecting the passages of two sets of tubes, substantially as described.

4. The combination with one or more steam-drums, two or more water-drums and water-tubes connecting the steam-drums with the water-drums and arranged in sets, and means to direct furnace-gases through sets of tubes; of an auxiliary combustion-chamber behind the main combustion-chamber, staggered partitions therein and openings in the wall between the two combustion-chambers and between partitions to supply furnace-gases, and means to admit air to the auxiliary chamber, said auxiliary chamber intermediate sets of tubes, substantially as described.

5. The combination with one or more steam-drums, two or more water-drums and water-tubes connecting the steam and water drums arranged in sets, and a main combustion-chamber separating the water-drums; of an auxiliary combustion-chamber independent of the main one or ones and separated therefrom by a wall, having one or more openings to admit furnace-gases to the auxiliary combustion-chamber, said wall also provided with air-inlet passages to preheat air supplied to the auxiliary combustion-chamber, substantially as described.

6. In a steam-boiler, the combination with the steam-drum and water-tubes arranged in sets having conducting-passages formed within the sets for the furnace-gases, of a fire-brick, auxiliary combustion-chamber interposed between the sets of tubes to form a continuous passage for furnace-gases from one set of tubes to another, substantially as described.

In testimony that I claim the foregoing as my invention I have signed my name in presence of two subscribing witnesses.

RICHARD SCHULZ.

Witnesses:
  JOHANNES HEIN,
  WOLDEMAR HAUPT.